July 4, 1939.  E. THORESEN  2,164,671
FLUID METER
Filed April 20, 1938   3 Sheets-Sheet 3

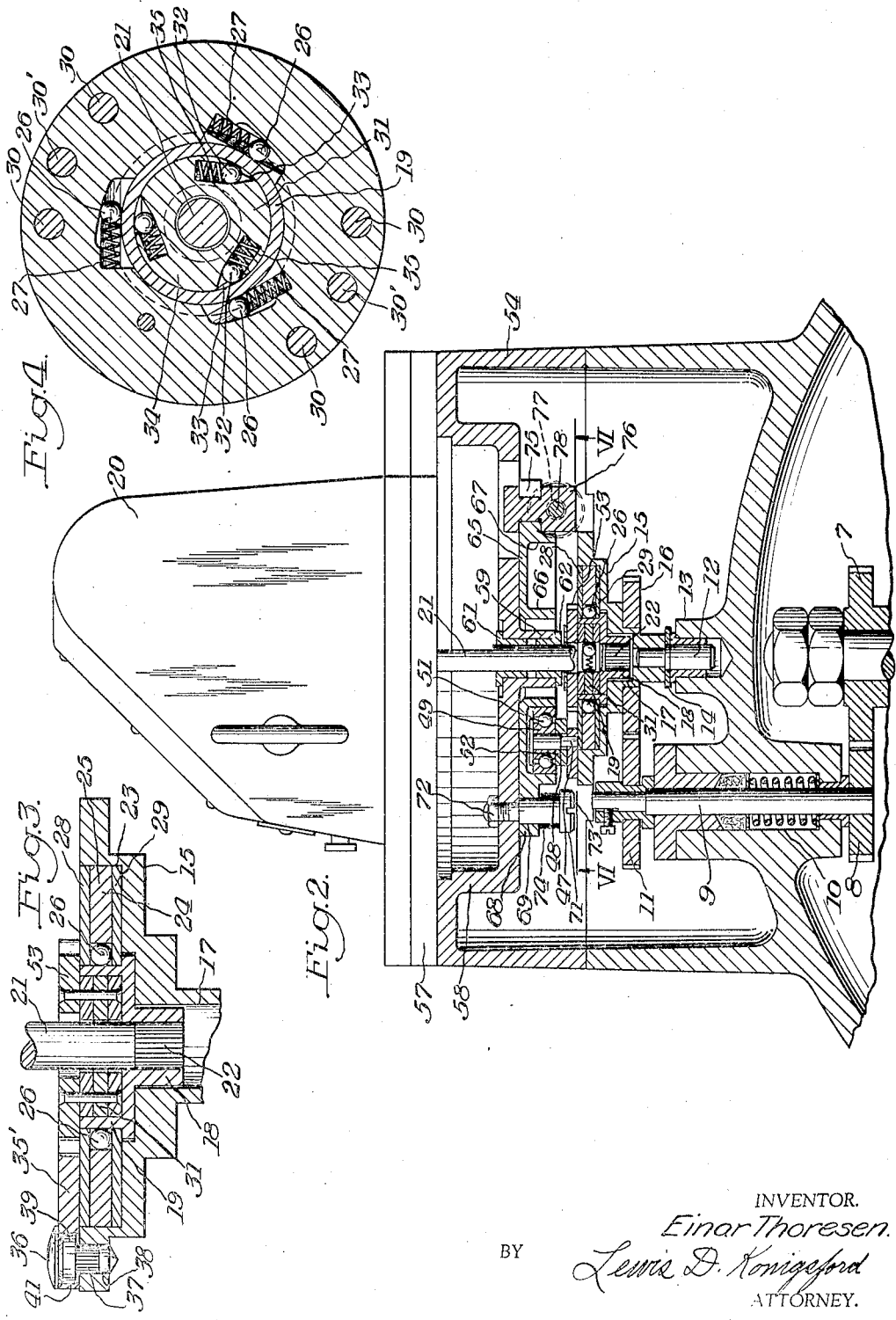

INVENTOR.
Einar Thoresen.
BY Lewis D. Konigsford
ATTORNEY.

Patented July 4, 1939

2,164,671

UNITED STATES PATENT OFFICE 2,164,671

FLUID METER

Einar Thoresen, Pittsburgh, Pa., assignor to Pittsburgh Equitable Meter Company, Pittsburgh, Pa., a corporation of Pennsylvania Application April 20, 1938, Serial No. 203,086

4 Claims. (Cl. 74—133)

This invention relates to fluid meters, and relates particularly to meters having means to coordinate the preferred operating range or accuracy spread of the meter to the register. The invention is particularly applicable to the meter described and claimed in the patent application of Frank S. Brooks and Walter H. Marsh, filed May 6, 1936, for Rotary meter, but is not limited thereto.

It is an object of my invention to provide a fluid meter having therein mechanism which may be adjusted with precision to calibrate the meter with the register, which is simple in construction, and inexpensive to manufacture.

According to the present invention, a fluid meter drives a register by primary and secondary one-way clutches, which are sequentially driven by means of a rack and pinion, and a member guided in a track surrounding said clutches imparts a periodic overdrive to the secondary clutch, which is determined by the displacement of the track. The amount of overdrive may be determined by adjusting the position of the track.

Figure 1:
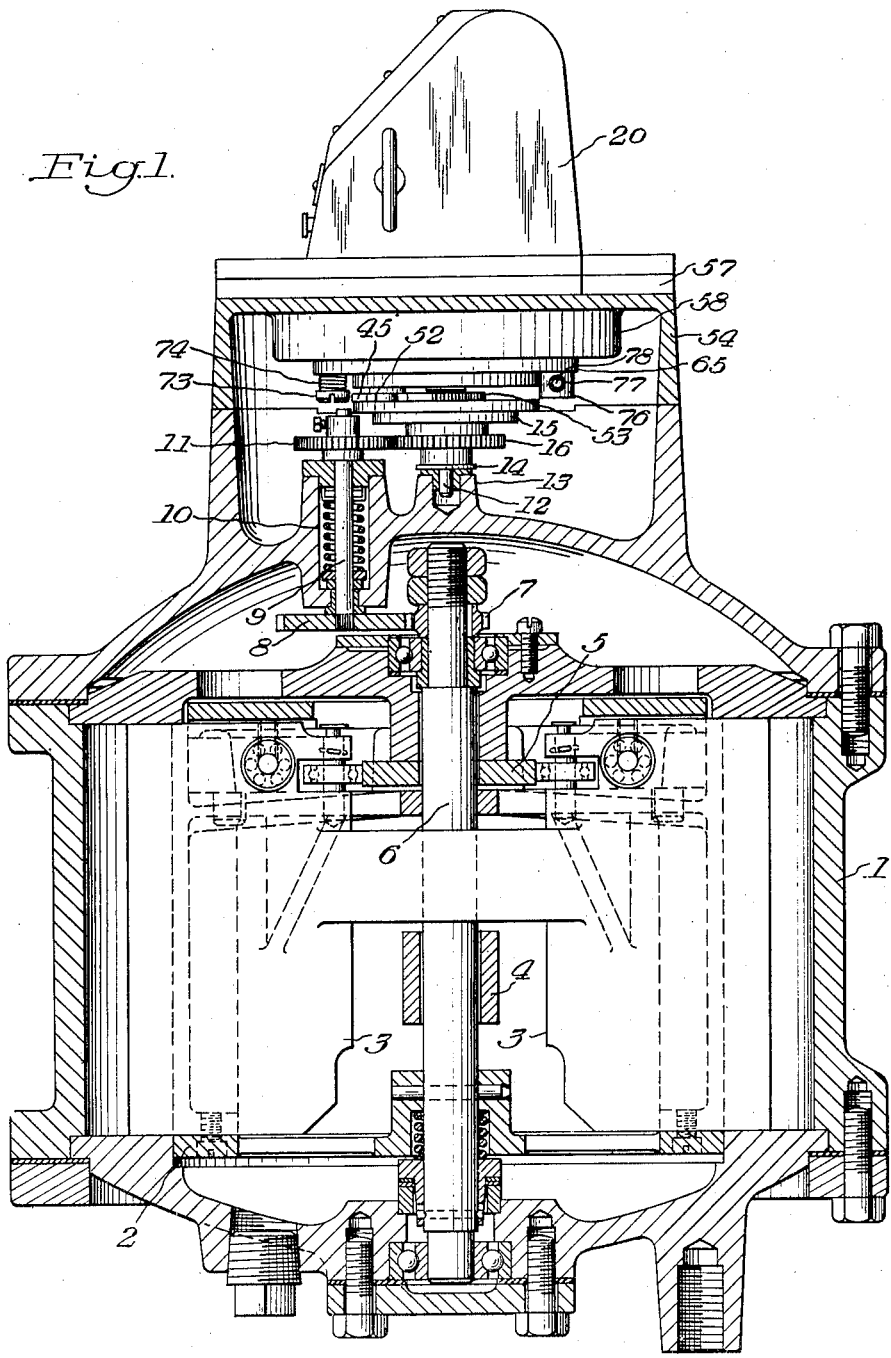
Figure 5:
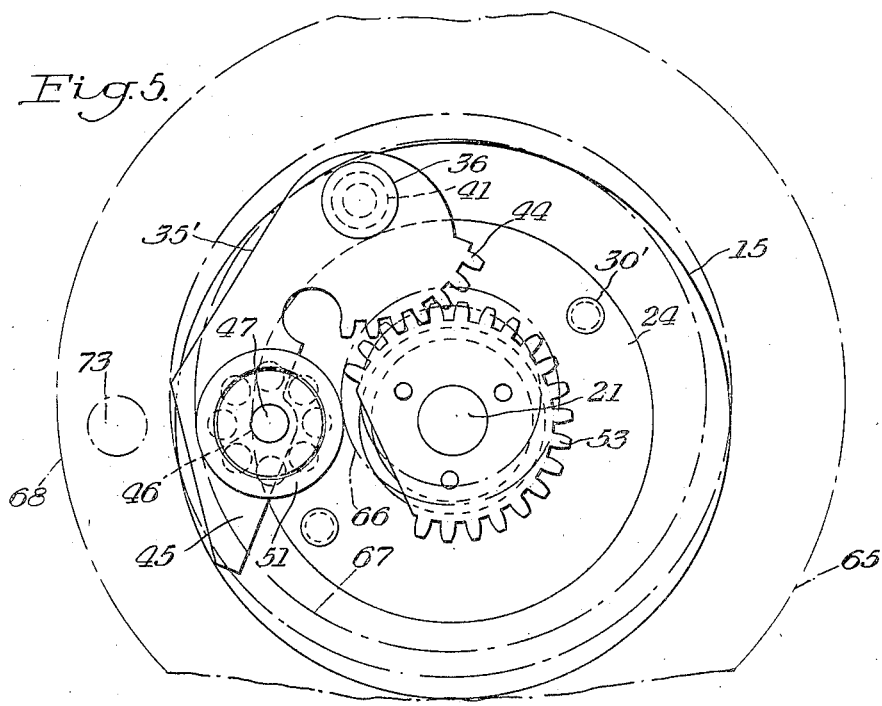
Figure 6:
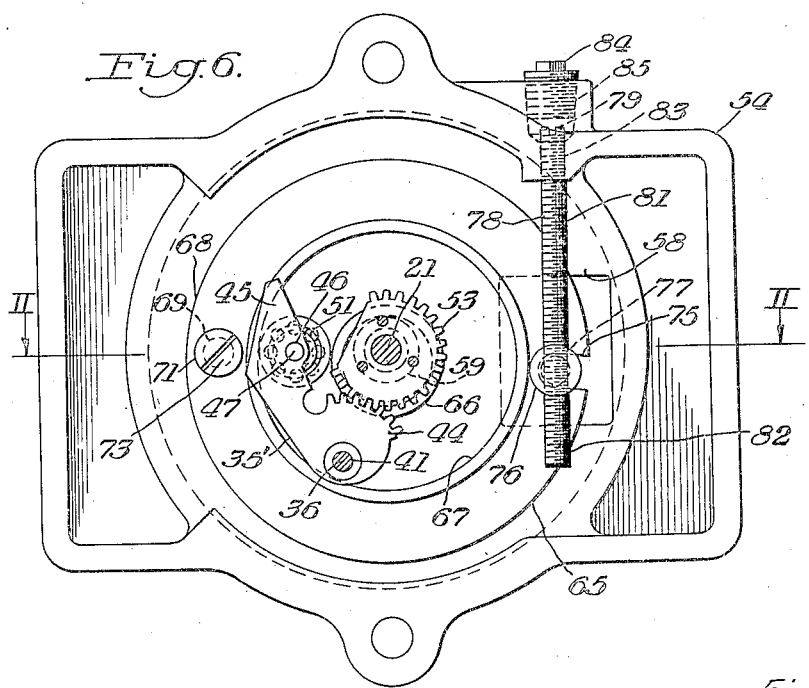

For a detailed description of the invention, reference is had to the following specification taken in connection with the accompanying drawings wherein:

Figure 1 is a view partly in section of a preferred embodiment of my invention applied to a meter, Figure 2 is an enlarged view taken on line II—II of Figure 6, Figure 3 is an enlarged section through the clutch mechanism shown in Figure 2, Figure 4 is a horizontal section through the clutch mechanism, Figure 5 is a plan view on an enlarged scale with the adjustment housing removed, and Figure 6 is a bottom view taken on line VI—VI of Figure 1.

Referring to the drawings, there is shown in Figure 1 a meter 1 in section, which preferably is of the rotary type comprising a cylindrical rotor 2 and two pairs of connected vanes, 3, 4, operated by a cam 5 to have a shuttle motion as the rotor rotates. A shaft 6 upon which the rotor 2 is secured has a gear 7 thereon. Gear 7 meshes with gear 8 on shaft 9 passing through a stuffing box 10, and shaft 9 at its upper end carries a gear 11 pressed on a hub and secured to the shaft by a set screw. A stub shaft 12 is journalled in a bushing located in boss 13 and has an anti-friction washer 14 of bronze or other suitable material resting on the bushing. A stepped table or plate 15 is secured to shaft 12 and bears on washer 14 and a gear 16 is held on plate 15 by a pressed fit and meshes with gear 11. By changing the ratio of gears 11 and 16 the driving ratio may be changed to bring the register 20 into approximate proper relation to the meter.

The plate 15 has a central bore 17 (Figure 3) which loosely receives the hub 18 of a clutch drum 19 having inner and outer clutch surfaces. A central shaft 21 has its lower end fluted at 22 whereby it is secured to the hub 18 of the clutch drum 19, the shaft 21 extending upwardly through the mechanism to operate the register through suitable change gears (not shown). The plate 15 is recessed at 23 and carries within the recess an exterior or primary one-way grip clutch designated generally by the numeral 24. The clutch is constructed in any suitable manner, and in the preferred embodiment comprises an annular central metal disc 25 having recesses in its inner periphery, in which are located steel balls 26 urged inwardly by springs 27 in the recesses. Two external or cover plates 28 and 29 are provided, the whole assembly being secured together by rivets 30, and the external clutch assembly 24 is secured to the plate 15 by means of rivets 30'. Within the clutch drum is a secondary similar one-way clutch assembly designated generally by the numeral 31, and similarly constructed except that balls 32 are received in the tangential recesses 33 in the outer periphery of the clutch disc 34 and urged outwardly by springs 35. The secondary clutch assembly is freely rotatable on the driven shaft 21 on which it is journalled, and the arrangement of recesses therein is such that when the clutch drum is driven by the outer clutch 24 the clutch drum 19 idles over the balls 32 in the secondary clutch.

A compensator arm 35' is secured to the outer periphery of plate 15 on a headed pivot pin 36 which is fluted at 37 and is driven into a bore 38 near the periphery of the plate. The pivot pin 36 has an enlarged journalled portion 39 about which the compensator arm may oscillate, the enlarged portion being received in a bore 41 in the compensator arm, the head of the pivot pin preventing removal or accidental displacement of the compensator arm. The compensator arm 35' comprises a segmental portion having gear teeth 44 at its periphery, and an extension 45 having a bore 46 therein. A stud 47 having a shoulder 48 is received in this bore, and the sleeve 49 and a ball bearing roller assembly 51 are pressed onto stud 47, a spacing washer 52 being interposed between the sleeve 49 and the compensator arm 35'. The stud 47 may be secured to the adjustment arm by riveting its lower end or in any other suitable manner. An adjustment driving clutch mutilated gear 53 is riveted to the inner one-way clutch member 31 and the teeth thereof mesh with the teeth 44 of the compensator arm.

The meter case has an adjustment housing 54 of generally rectangular shape secured thereon in any suitable manner, for example, by bolts (not shown), and a register case 20 is secured to the adjustment housing by an adapter plate 57. The adjustment housing has a dividing web 58 therein which has a central hub 59 that is bored and receives the two flanged bushings 61 and 62. The central shaft 21 is journalled in the bushings 61 and 62 and extends through the adjustment housing 54 to the register 20 which is driven thereby in known manner. The central web 58 of the adjustment casing carries an adjustable plate 65 comprising an inner track surface 66 and an outer track surface 67, and a flange 68 of the track has a bore 69 therethrough. The plate member surrounds the central hub of the partition and is secured thereto by a shouldered screw 71 passing through the partition and held in place by a nut 72. The screw has a head 73, and a coil spring 74 interposed between the head and the flange 68 of the plate retains the plate against the bottom of the dividing partition 58.

Diametrically opposite the screw 71 is a slot 75 in which is received a double headed stud 76 having a threaded bore 77 through one head. Adjustment screw 78 has a kerf 79 at its end and is threaded at each end by threads of different pitch as indicated at 81 and 82 so as to secure a micrometer adjustment. The screw is threaded through a threaded hole 83 in the adjustment housing, so that it is accessible from the exterior, and a plug 84 closes the opening 85 in the housing. By removing plug 84 access may be had to the adjustment screw.

The operation of the mechanism will now be described. Referring to Figure 5, the table 15 carries the arm 35' pivoted on the pin 36, and meshing gear teeth 44 and 53 cause the inner clutch 31 to rotate normally in unison with outer clutch member 24. When walls 66 and 67 of the track have been moved eccentrically to shaft 21 the roller 51 moving in track 66, 67 will follow an eccentric path and thus cause arm 35' to oscillate about the pin 36 during rotation. The oscillation of arm 35' oscillates gear 53 through its connection with the segment teeth 44. Gear 53 is secured to the interior one-way clutch member 31 so that when gear 53 is oscillated in counter-clockwise direction while rotating as viewed in Figure 4, the interior clutch 31 will drive the clutch drum 19 and with it the shaft 21. When the gear 53 is oscillated in clockwise direction while rotating, clutch member 31 will idle and the shaft 21 will be driven by the outer clutch member 24 at the same speed as the table 15. It will be apparent that interior clutch 31 will be effective in driving the shaft 21 only when this clutch member is rotating faster and in the same direction as the outer clutch member so that the shaft 21 will periodically receive an overdrive which compensates for any inaccuracy between the register and meter, depending on the eccentricity of the track which is adjusted by the screw 81.

The invention may be embodied in other specific forms without departing from the spirit or scope thereof, and the present embodiment thereof is to be considered as illustrative rather than restrictive of the invention.

What is claimed and desired to be secured by United States Letters Patent is:

1. In a compensated drive, a driving shaft, a driven member, a primary one-way clutch member operated by said driving shaft to rotate said driven member in one direction, a secondary one-way clutch member adapted to rotate said driven member when turned in the same direction, a gear connected to said secondary one-way clutch member, a pivoted gear segment rotating with the primary clutch member in mesh with said gear, and means for oscillating said segment to impart an overdrive impulse to the driven member.

2. In a compensated drive, a driving shaft, a driven member, a primary one-way clutch member operated by said driving shaft to rotate said driven member in one direction, a secondary one-way clutch member adapted to rotate said driven member when turned in the same direction, a gear secured to the secondary clutch member, a second gear meshing therewith and pivotally secured to rotate with the primary one-way clutch member, a track surrounding said clutches, a roller secured to said second gear and moveable in said track, and means for adjusting the position of the track with relation to the clutches.

3. In a compensated drive, a driving shaft, a driven member, a primary one-way clutch member operated by said driving shaft to rotate said driven member in one direction, a secondary one-way clutch member adapted to rotate said driven member when turned in the same direction, a gear connected to said secondary one-way clutch member, a gear segment in mesh with said gear and pivoted to rotate with said primary one-way clutch member, and a track for oscillating said segment to impart an overdrive impulse to the driven member.

4. In a compensated drive, a driving shaft, a driven member, a primary one way clutch member operated by said driving shaft to rotate said driven member in one direction, a secondary one way clutch member adapted to rotate said driven member when turned in the same direction, a gear connected to said secondary one way clutch member, a gear segment in mesh with said gear and pivoted to rotate with said primary one way clutch member, a track for oscillating said segment to impart an overdrive impulse to the driven member, and means to adjust the position of said track.

EINAR THORESEN.